Figure 1:
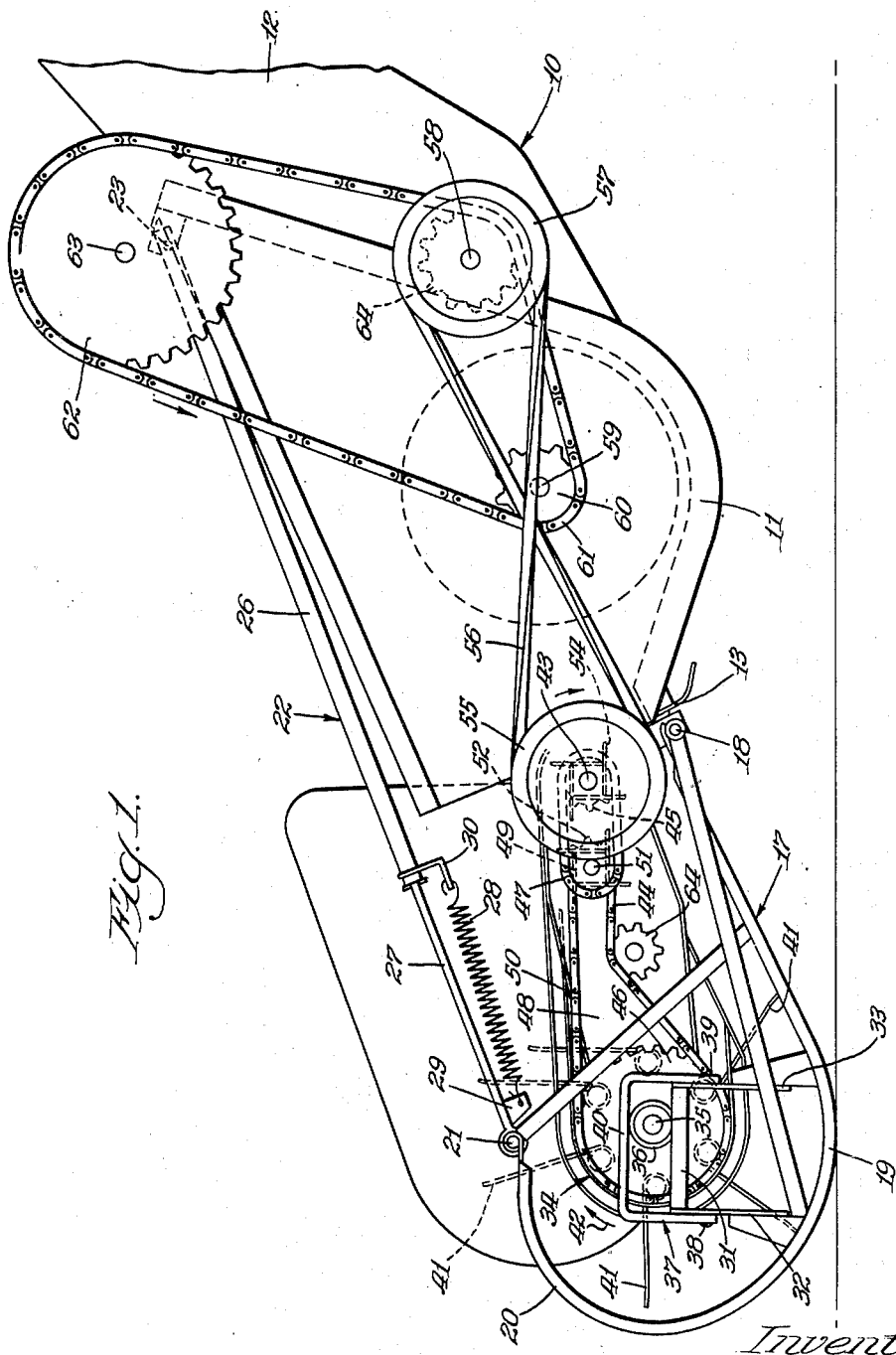

Aug. 1, 1950  G. W. PEARSON  2,517,413
FLOATING PICKUP ATTACHMENT FOR HARVESTERS
Filed Dec. 21, 1946  2 Sheets-Sheet 1

Inventor
Gilbert W. Pearson
By Paul O. Pippel
Atty.

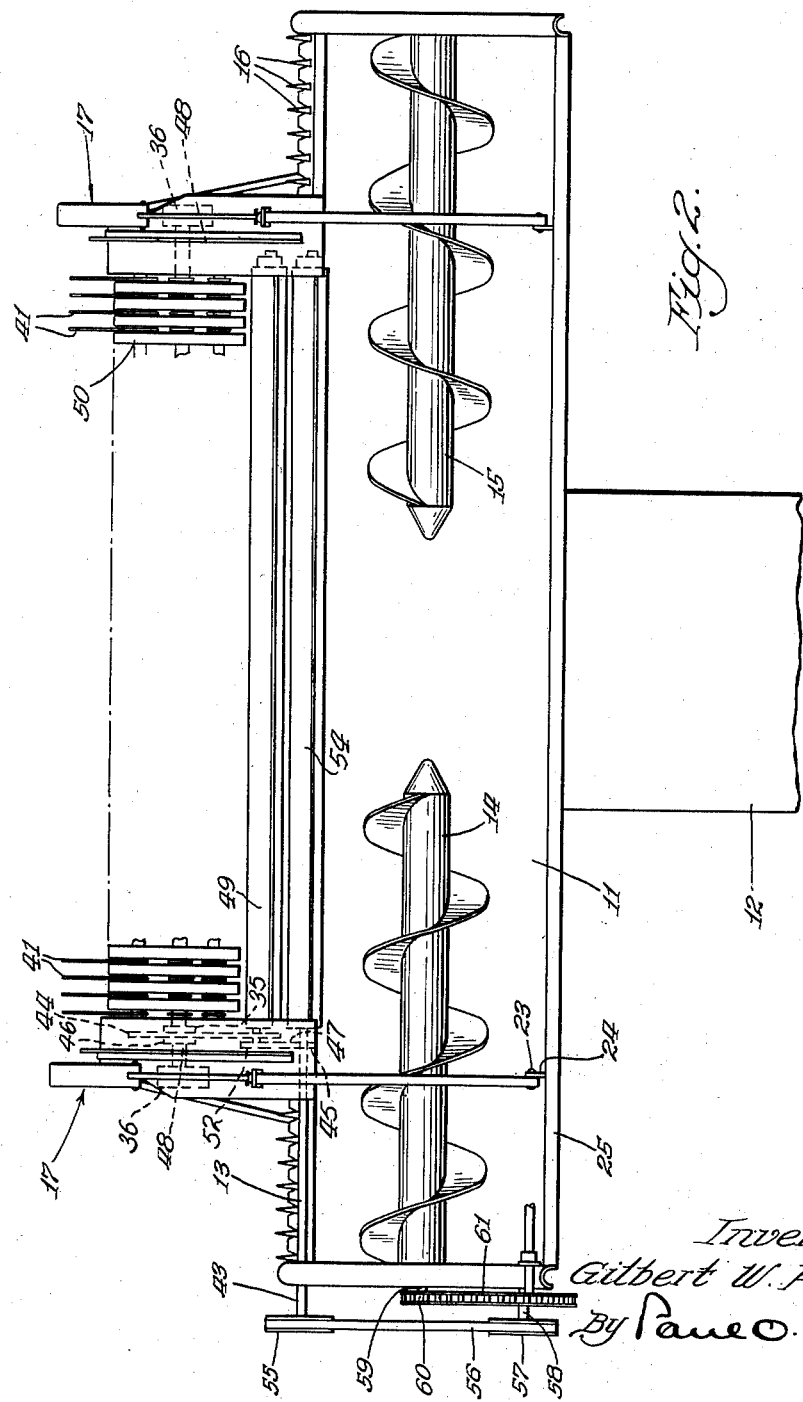

Patented Aug. 1, 1950

2,517,413

UNITED STATES PATENT OFFICE 2,517,413

FLOATING PICKUP ATTACHMENT FOR HARVESTERS

Gilbert W. Pearson, Moline, Ill., assignor to International Harvester Company, a corporation of New Jersey Application December 21, 1946, Serial No. 717,767

1 Claim. (Cl. 56—364)

This invention relates to a new and improved floating pick-up attachment for harvesters and has for one of its principal objects the provision of a pick-up pivotally attached to the forward end of a harvester platform and extending forwardly thereof a relatively long distance.

Another important object of this invention is to provide a pick-up attachment for harvesters which is arcuately floatable about the forward end of a harvester platform and counter-balanced therewith so that upon striking any obstruction or great quantity of grain the pick-up will normally yield upwardly.

A further object of this invention is to provide an elongated pick-up attachment spaced considerably forwardly of the regular harvester platform and having means interposed between the pick-up and the platform for carrying grain and straw from the pick-up to the platform.

A still further object of this invention is to provide a plurality of paddle type feed rolls in association with an arcuately floatable pick-up attachment to permit relatively greater movement by the pick-up attachment.

Other and further important objects of this invention will become apparent from the disclosures in the following specification and the accompanying drawings, in which:

Figure 1 is a side elevational view of the floating pick-up attachment for harvesters; and Figure 2 is a top plan view of the device as shown in Figure 1.

As shown in the drawings, the reference numeral 10 indicates generally a platform of a harvester such as a harvester thresher. In recent years the over-all design of harvester thresher platforms has been changed considerably. Heretofore the platforms were relatively horizontal and were pivoted at their rear ends in substantially the same horizontal plane occupied by the forward end of the platform. With such a construction, it was possible to fixedly attach a pick-up at the forward end of the platform and rely solely on the arcuately swinging movement of the entire platform for variations in ground contour and on occasions when the implement struck an obstruction. However, the present harvester threshers have what is called a scoop shovel type of platform having a relatively steeply inclined back portion and hinged at its rear a relatively great distance above the ground line and also very much above the forward end of the platform. From this it will be seen that a pick-up attachment rigidly fastened to the forward end will not be able to raise upon receiving greater quantities of grain and straw, but rather will tend to become buried in the ground because of the high pivotal attachment of the platform.

The platform 10 has a relatively wide forward portion 11 and an upwardly and rearwardly extending narrow portion 12. The forward edge 13 of the wide portion 11 is rigidly reinforced and normally has a reciprocating cutter bar mounted thereon. The wide portion of the platform 11 has opposed and aligned feed augers 14 and 15 which are adapted to feed the grain cut by the sickle 16 circularly of the wide portion 11 whereupon it is delivered to a position adjacent the narrow upwardly and rearwardly extending portion 12. When a pick-up attachment is used on a harvester thresher the purpose is to pick-up grain previously cut and laid in windrows. It is obvious, then that the sickle or cutter bar 16 does not function in its usual manner.

As best shown in Figure 1, an elongated supporting structure or frame member 17 is pivotally attached at 18 to the reinforced forward edge 13 of the platform 10. The frame member extends forwardly and downwardly from a ground engaging runner 19 and continues upwardly and thence rearwardly as shown by the portion 20 to a hinge attachment at 21 with an extensible arm member 22. The arm 22 is pivotally attached at 23 to a lug member 24 fastened to the upper rear wall 25 of the wide portion 11 of the platform 10. The arm 22 consists of a sleeve member 26 and a telescoping rod 27 slidably engaging the bore of the sleeve 26. As the frame member 17 floats or arcuately swings about its hinge 18 dependent upon the contour of the ground and the runner or skid 19 in engagement therewith, the rod member 27 of the arm 22 telescopes more or less the sleeve member 26 of the arm 22. Hence, when the frame member 17 swings upwardly the rod 27 projects further within the sleeve 26 and when the frame member 17 moves downwardly the rod member 27 is withdrawn from the sleeve 26.

A spring 28 normally urges greater telescoping of the rod 27 within the sleeve 26. The spring 28 is attached at its lower forward end to a lug 29 fixedly attached to the rod 27, and the rearward upper end of the spring is attached to an angle member 30 fixedly attached to the sleeve member 26. As shown in Figure 2, the spring balanced elongated frame member 17 is duplicated on both sides of the wide portion 11 of the platform 10 and inasmuch as both parts are identical and symmetrical about the center of the pick-up attachment, similar numbers will be assigned to identical parts on the opposite end of the machine.

In each of the frame members 17 a longitudinally extending track member 31 is rigidly held spaced above the ground engaging runner portion 19. Support members 32 and 33 are adapted to carry the forward and rearward ends respectively of the track 31. A pick-up cylinder 34 mounted on a shaft 35 is positioned between the spaced frame members 17. On the outer ends of the shaft 35 are roller members 36 which are adapted to engage the track members 31. In order to maintain the rollers 36 in engagement with the track 31 a bail member 37 is riveted or otherwise attached at 38 and 39 to the forward and rearward upwardly extending supporting members 32 and 33 respectively. The bail 37 extends upwardly and over the track 31. The top 40 of the bail 37 is parallel with the track 31 and is spaced from the track a distance which is just enough to receive the roller 36 to thereby keep the roller closely confined.

The pick-up cylinder is provided with a plurality of radially extending spring fingers 41. The construction of the pick-up cylinder and its spring fingers has not been shown in detail as it does not constitute invention. The pick-up employed is shown in the patent to Raney et al. 1,815,327 dated July 21, 1931. The cylinder 34 rotates in a clockwise direction as viewed in Figure 1 and indicated by the arrow 42. A driven shaft 43 journally supported in the frame members carries a sprocket 45 which imparts drive to a chain 47 extending forwardly around a sprocket 52 on the shaft 51. A second smaller sprocket fastened to the shaft 51 is thereupon driven in a clockwise direction and imparts drive to a chain 44 which extends forwardly around a sprocket 46 associated with the pick-up cylinder 34. An idler sprocket 64 engages the chain 44 to hold it taut. The cylinder shaft 35 is carried on spaced arms or side plates 48. These arms are hingedly attached to the shaft 43 which is carried on the forward end of the platform and the pick-up cylinder 34 is permitted arcuate movement upon corresponding movement of the arms about the shaft 43. The hinge attachments of the frame members 17 and the pick-up cylinder 34, namely 18 and 43, are spaced vertically from one another on the forward end of the platform so that upon arcuate movement of these elements there will be corresponding relative movement which is compensated for by the longitudinal movement of the cylinder 34 by its roller members 36 along the longitudinally extending track members 31.

The frame members 17, as previously stated, are elongated. This permits magnified arcuate movement whereupon the pick-up attachment may accommodate greater amounts of grain and straw in a windrow. The pick-up cylinder 34 is relatively greatly spaced from the forward edge of the platform 10 and arcuate movement about the pivots 18 and 43 will permit greater vertical movement of the forward ends of the frames 17 and the cylinder 34 without approaching an undesirable angle. In the present device the pick-up cylinder 34 has greater possibilities of continuous contact with the grain to be picked up regardless of the quantity of the grain in the windrow. The spring members 28 are sufficiently strong to cause the pick-up and frame members 17 to be raised when the device strikes an obstruction so that there is a minimum breakage of parts.

The elongated frame members 17 have necessitated a means for conveying the grain picked up by the pick-up cylinder 34 to the wide portion 11 of the platform 10. The spring fingers 41 deposit the grain at a point above a paddle feed roll member 49 which is positioned just to the rear of the cylinder shield 50. The shield 50 is in the form of spaced strip members which extend alternately between the spring fingers 41. The paddle type feed roll 49 is mounted on the shaft 51 carrying the sprocket 52 which is driven by the chain 47. Another paddle feed roll 54 is mounted on the shaft 43 and is driven in a clockwise direction similar to the paddle feed roll 49.

In operation the pick-up cylinder by its spring fingers 41 picks up grain from a windrow, carries it back over the shield 50 and deposits the grain on the paddle wheel 49 which immediately carries it rearwardly, depositing it on the paddle wheel 54. This last paddle wheel throws the grain rearwardly onto the platform 11 into the augers 14 and 15 which carry the grain laterally of the platform whereupon it is carried upwardly and rearwardly and threshed by a threshing mechanism (not shown).

The shaft 43 has mounted thereon a sheave or pulley 55 which is driven by a belt member 56 from the sheave 57 mounted on a shaft 58. The augers 14 and 15 are carried on a transversely extending shaft 59 and by means of a sprocket 60 and chain 61 the augers are driven by the sprocket 62 mounted on a drive shaft 63. The chain 61 is carried about the sprocket 64 fastened to the shaft 58 and thereupon imparts drive from the shaft 63 to the shafts 58 and 59 simultaneously.

The function of the pick-up attachment of this invention is relatively simple, yet accomplishes a very desirable operation. The cylinder 34 picks the grain up from the windrow and by means of the spring fingers 41 and the conveying means consisting of the paddle wheels 49 and 54 the grain and straw is "walked" rearwardly with a minimum of agitation so that the grain is deposited on the wide portion of the platform 11 without losing the valuable grain kernels.

Many details of construction may be varied throughout a wide range without departing from the principles disclosed herein and I therefore do not propose limiting the patent granted hereon otherwise than as necessitated by the appended claim.

What is claimed is:

A pick-up attachment for agricultural implements comprising a support, a structure hinged to said support, a pick-up cylinder journally carried in a transverse position on the end of said structure away from its hinge attachment to said support, said pick-up cylinder having radially extending fingers for picking up material from the ground and depositing it intermediate the pickup cylinder and its hinge attachment, a plurality of transversely disposed closely adjacent paddle feed rolls journally mounted on said structure in a position between the pick-up cylinder and the hinge attachment to said support to receive material from the radially extending fingers of the pick-up cylinder and convey it to the support, said plurality of paddle feed rolls disposed beneath the maximum horizontal level attained by the radially extending fingers, and means for rotatably driving said pick-up cylinder and said paddle feed rolls in the said direction.

GILBERT W. PEARSON.

REFERENCES CITED

The following references are of record in the file of this patent:

UNITED STATES PATENTS

| Number | Name | Date |
|---|---|---|
| Re. 21,571 | Innes | Sept. 17, 1940 |
| 998,058 | Warrenfeltz | July 18, 1911 |
| 1,901,092 | Fisk | Mar. 14, 1933 |
| 2,286,095 | Innes | June 9, 1942 |
| 2,363,888 | Martin | Nov. 28, 1944 |